United States Patent
Koenig (10) Patent No.: US 10,719,868 B2
(45) Date of Patent: Jul. 21, 2020

(54) SYSTEM AND METHOD FOR PROVIDING LOCATION-BASED AND ACTIVITY-CENTRIC RECOMMENDATIONS FOR CLEANING PRODUCTS AND OTHER SERVICES

(71) Applicant: Eric Koenig, Huntington, NY (US)

(72) Inventor: Eric Koenig, Huntington, NY (US)

(*) Notice: Subject to any disclaimer, the term of this patent is extended or adjusted under 35 U.S.C. 154(b) by 291 days.

(21) Appl. No.: 15/934,907

(22) Filed: Mar. 23, 2018

(65) Prior Publication Data

US 2018/0276735 A1    Sep. 27, 2018

Related U.S. Application Data

(60) Provisional application No. 62/476,757, filed on Mar. 25, 2017.

(51) Int. Cl.
| | |
|---|---|
| *G06Q 30/06* | (2012.01) |
| *G06Q 30/02* | (2012.01) |
| *G06F 3/01* | (2006.01) |
| *G06F 3/048* | (2013.01) |
| *G06F 3/0354* | (2013.01) |
| *H04W 4/02* | (2018.01) |
| *G06F 3/0488* | (2013.01) |

(52) U.S. Cl.
CPC ......... *G06Q 30/0631* (2013.01); *G06F 3/017* (2013.01); *G06F 3/03547* (2013.01); *G06F 3/0488* (2013.01); *G06Q 30/0251* (2013.01); *G06Q 30/0261* (2013.01); *G06Q 30/0269* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 6,222,465 B1 * | 4/2001 | Kumar | ............... | G06F 3/017 |
| | | | | 341/20 |
| 6,377,810 B1 * | 4/2002 | Geiger | ............... | H04L 63/123 |
| | | | | 455/456.2 |
| 7,032,229 B1 * | 4/2006 | Flores | ............... | G06F 11/3419 |
| | | | | 709/224 |
| 8,909,950 B1 * | 12/2014 | Levchuk | ............... | H04W 52/223 |
| | | | | 713/300 |
| 9,383,914 B2 * | 7/2016 | Clements | ............... | G06F 3/013 |

(Continued)

OTHER PUBLICATIONS

Clark, C., "Hidden germs thrive in your home," Home: 5. News Limited. [HomeNSW Edition], Aug. 14, 2014. (Year: 2014).*

(Continued)

*Primary Examiner* — Nicholas D Rosen
(74) *Attorney, Agent, or Firm* — Georgiy L. Khayet (57) ABSTRACT

The present invention is a system and application that is engineered to "learn" the current location and/or activity of a user by tracking, monitoring, recording, analyzing, etc. where that user goes, as well as what that user is doing, in order to determine if they may be in an area deemed to be a "high touch surface" location and therefore more susceptible to germs and bacteria. If it is the present invention will then utilize artificial intelligence (AI) and algorithms in order to recommend to said user a variety of cleaning, sanitizing, disinfecting, and other such products and services for their mobile device, person, vehicle, or other such items.

20 Claims, 5 Drawing Sheets

(56) References Cited

U.S. PATENT DOCUMENTS

| | | | | |
|---|---|---|---|---|
| 9,477,317 | B1* | 10/2016 | Clements | G06F 3/017 |
| 9,594,500 | B2* | 3/2017 | Clements | G06F 3/013 |
| 9,859,731 | B2* | 1/2018 | Boss | H02J 7/0047 |
| 2007/0043611 | A1* | 2/2007 | Newman | G06Q 30/02 705/14.44 |
| 2008/0269953 | A1* | 10/2008 | Steels | H04L 12/10 700/295 |
| 2014/0006794 | A1* | 1/2014 | Odessky | G06F 21/36 713/182 |
| 2015/0000025 | A1* | 1/2015 | Clements | G06F 3/013 4/443 |
| 2015/0000026 | A1* | 1/2015 | Clements | G06F 3/013 4/443 |
| 2015/0106011 | A1* | 4/2015 | Nesbitt | G01C 21/3476 701/412 |
| 2016/0239808 | A1* | 8/2016 | Ryu | G06Q 10/1093 |
| 2017/0207646 | A1* | 7/2017 | Boss | H02J 7/0047 |

OTHER PUBLICATIONS

McKindles, B., et al., "Fight against winter bugs," Messenger Inquirer [Owensboro, Kentucky] Dec. 22, 2016. (Year: 2016).*

* cited by examiner

SYSTEM AND METHOD FOR PROVIDING LOCATION-BASED AND ACTIVITY-CENTRIC RECOMMENDATIONS FOR CLEANING PRODUCTS AND OTHER SERVICES

CROSS-REFERENCES TO RELATED APPLICATIONS (IF ANY)

This is the non-provisional and claims of the provisional application No. 62/476,757 filed Mar. 25, 2017 which is incorporated by reference.

BACKGROUND OF THE INVENTION

There are known services that make recommendations to mobile app users based upon where they are or what they are doing.

However, there are presently no known services that track, monitor, record, analyze, etc. where a user goes, or what they are doing, in order to "learn" the current location and/or activity of said user and determine if the locations and/or activities of said user involve "high touch surfaces," which possess a high potential of susceptibility to bacteria.

Likewise, there are not any known services that also provide to the user recommendations for a series of cleaning, sanitizing, disinfecting, and other such products and services that they can use on their mobile device, person, vehicle, or other purpose—as a result of their location or activity.

There is still room for improvement in the art.

OBJECT OF THE INVENTION

As such, it is an object of the present invention to track, monitor, record, analyze, etc. where a user goes as well as what that user is doing in order to "learn" the current location and/or activity of said user.

It is another object of the present invention to utilize this data to determine which locations and/or activities involve "high touch surface" locations (i.e. susceptibility to bacteria).

It is yet another object of the present invention to use this data (i.e. the user location/activity learned by the system, as well as the likelihood of that location/activity involving "high touch surfaces") to then provide to said user recommendations on cleaning, sanitizing, disinfecting, and other such products and services for their mobile device, person, vehicle, or other purpose. Other purposes may include but are not limited to apparel, portable furniture, electronic devices, keys, jewelry, tools, equipment, gear, and accessories.

For example, if a user is at a mall, and the mall has a higher susceptibility to pathogens because there are counters, carts, bathrooms, public light switches, door handles, the user will then be alerted about the possibility of contamination and prompted to clean their items after visiting this location, or in real time while at the location. In one embodiment, this recommendation might be a paid advertisement.

If a user is in a park for an extended period of time, the algorithms might determine that the user is not only in a public place, but that they might be exercising and they're sweating. Or the user could be at the gym, touching equipment which has been touched by others.

It is yet another object of the present invention to use this data to also provide to said user suggestions for products and/or services not related to the cleaning, sanitizing, disinfecting, and other such actions for their mobile device, person, vehicle, or other purpose, but based upon their location/activity, the weather, and time of day, in addition to any notes, reminders, calendar events, and other information stored in that user's profile or otherwise made available by the user.

For example, upon detecting the user to be in a shopping center with high touch susceptibility to pathogens, the system would first alert the user to the need for cleaning their device. Then, because the system has identified the preferred foods of that user (based on access to that user's profiled data) and has access to the retail establishments in that immediate area (via a mapping API, for example), the system could alert the user to a health food store in that shopping center. And because the system has identified the time of day, it could recommend an organic smoothie for lunch. In one embodiment, this feature might be a paid advertisement.

BRIEF SUMMARY OF THE INVENTION

The present invention is engineered to "learn" the current location and/or activity of a user by tracking, monitoring, recording, analyzing, etc. where that user goes, as well as what that user is doing, in order to determine if they may be in an area deemed to be a "high touch surface" location and therefore more susceptible to germs and bacteria. In this event, the present invention will then utilize artificial intelligence (AI) and algorithms in order to recommend to said user a variety of cleaning, sanitizing, disinfecting, and other such products and services for their mobile device, person, vehicle, or other purpose, as well as products and/or services not related to the cleaning, sanitizing, disinfecting, and other such actions for their mobile device, person, vehicle, or other purpose, but based upon their location/activity and the time of day, in addition to any notes, reminders, calendar events, and other information stored in that user's profile or otherwise made available by the user. For example, these latter products and services may include but are not limited to eateries, retailers, entertainment venues, sporting events, musical acts, stage productions, and other local services or products.

BRIEF DESCRIPTION OF THE DRAWINGS

Without restricting the full scope of this invention, the preferred form of this invention is illustrated in the following drawings.

DETAILED DESCRIPTION OF THE INVENTION

There are a number of significant design features and improvements incorporated within the invention.

In the inventive system and method, a user installs a mobile application (app) on their device 20. They may be required to create a user profile, containing personal information to include but not limited to name, date of birth, address, gender, occupation, hobbies, and interests.

Figure 1:
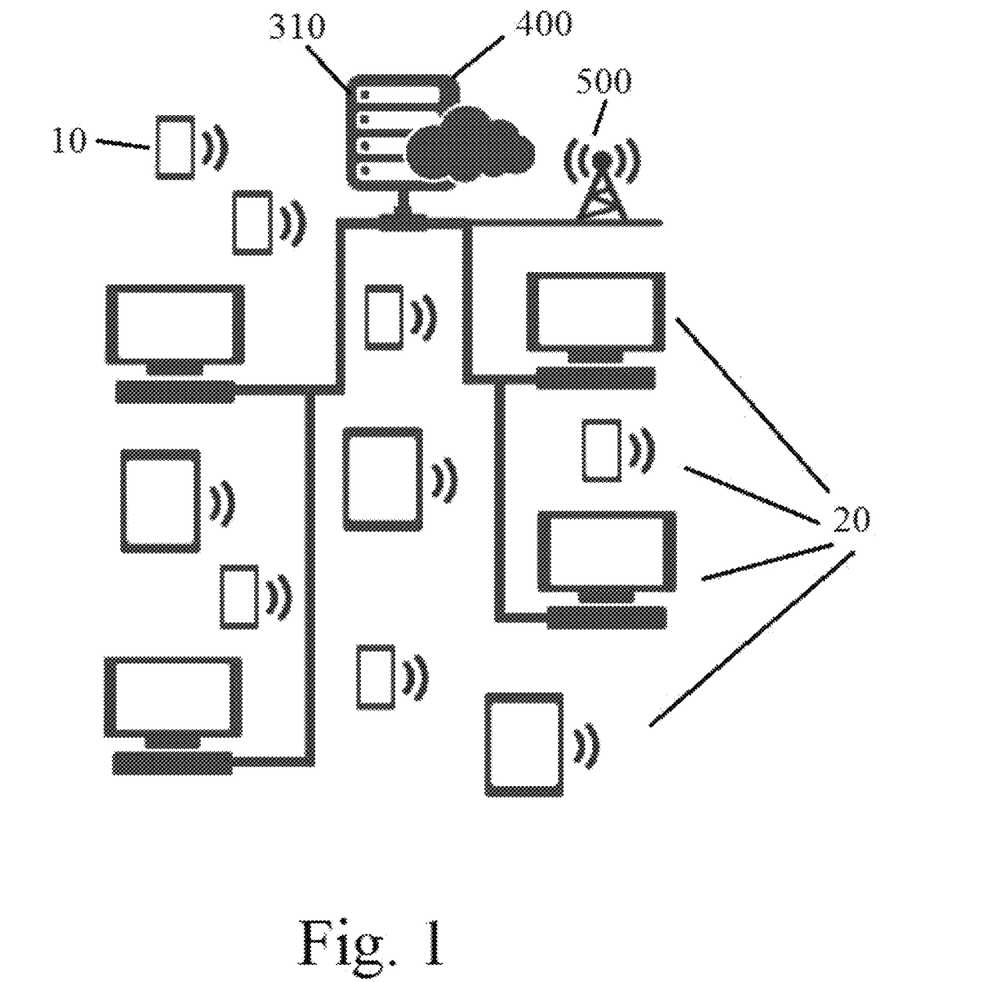
FIG. 1 displays the system architecture.

FIG. 1 displays the preferred embodiment of the system architecture accessed through an Internet, Intranet and/or Wireless network 500. However, the system 1 could be implemented on a device-to-device or client/server architecture as well.

In FIG. 1, the system is accessed from a user's computing device 10 through a web browser over HTTP and/or HTTPS protocols 500 or wireless network or cell phone to cell phone connection. A computing device 20, such as a cell phone, that can access the system 1 must have some version of a CPU, CPU memory, local hard disk, keyboard/keypad/input and display unit. The computing device 20 can be any desktop, laptop, tablet, smart phone or general-purpose computing device with an appropriate amount of memory suitable for this purpose and an active connection to the Internet 500. Computing devices like this are well known in the art and are not pertinent to the invention. The computing devices 20 can serve as an input/output (I/O) device for inputting an original writing and video from a user and for outputting a modified writing and video.

The system 1, data and processing code can reside in the non-transitory memory 310 of the one or more computing devices. The system 1 in the preferred embodiment would be written to act like a smart phone application (app).

After installing the app, the user engages with their mobile device 10 as normal. The app 1 will "learn" the user's current location and/or activity by tracking, monitoring, recording, analyzing, etc. where that user goes (for example but not limited to, via geospatial monitoring—e.g. GPS, beacons, or other such technology), as well as what that user is doing (for example but not limited to, via their mobile device usage—e.g. position/orientation of the device, use of the accelerometer, velocity of the user, and what apps that user has interacted with: for how long, when, with whom, what they view, etc.) This could be accomplished through, for example but not limited to, access to the battery consumption that the user's mobile device monitors. The battery consumption can either be per app or for the entire device.

After this data has been collected, it is sent to a centralized "cloud" server 400 for storage. Once uploaded, the data can be analyzed in real time in order to determine if that user is currently in an area deemed to be a "high touch surface" location and therefore more susceptible to germs and bacteria.

A "high touch surface" is categorized as any surface that receives a high volume of human contact, which increases the likelihood of bacterial contamination and cross-contamination susceptibility to various bacteria, pathogens, germs, viruses, infections, etc.

If the user is determined to be in a "high touch surface" location, then the present invention will recommend to that user a variety of cleaning, sanitizing, disinfecting, and other such products and services for their mobile device, person, vehicle, or other purpose, to include but not limited to wipes, sprays, coatings, solutions, powders, gels, concentrates, and electronic and/or mechanical means.

In addition, it is also possible for the AI and algorithms of the inventive system and method to make product and/or service suggestions based upon the location and/or activity of that user, as determined by the present invention's machine learning, in addition to any notes, reminders, calendar events, and other information stored in that user's profile or otherwise made available by the user but with no correlation to the "high touch surface" location's susceptibility to germs and bacteria.

The inventive system will also include an educational component, with informative messages, for example, that will alert the user to the reason for the cleaning product and/or service recommendation. These informative messages can also educate the user about the features, functionality, and attributes of a specific product or service, using language and material provided by the marketer/brand.

In one hypothetical usage of the inventive system and method, a user is traveling by bus. Because the user has the required mobile app installed on their device, the location, movement, and velocity of that user can be tracked. The movement is then analyzed to identify that the user is making frequent stops—along a known bus route. The AI, using the algorithms of the inventive system, then determines that this user is traveling by bus, which triggers the "high touch surface" threshold—as it is known that public transportation is a heightened breeding ground for germs and bacteria.

In a study conducted for *USA TODAY* in October of 2016 ("Which city has the germiest cabs, buses and trains?" by Jeff Rossen and Anneke Foster, *USA TODAY*, Oct. 14, 2016), Jeff Rossen and his company Rossen Reports used a bacteria meter to test public transportation systems across New York City, Los Angeles and Chicago to see how dirty they really are. Health experts say anything over 100 is a fail. The CTA bus in Chicago tested at 730—more than seven times the recommended threshold—while the taxi came back with a score of 909, more than 800 points above the limit. However, the test run on the Chicago L train was the worst Jeff Rossen has ever seen, coming back with a result of 4,032, or over 40 times the acceptable amount of bacteria. As such, the opportunity for exposure to unwanted germs and bacteria while riding public transportation is significant.

In the aforementioned public transportation scenario, the user is then shown recommendations for a variety of cleaning, sanitizing, disinfecting, and other such products and services for use on their mobile device, person, vehicle, or other purpose. They may also be shown other product or service suggestions, unrelated to the "high touch surface" potential of that location or activity, but instead related to the location or activity in general, for example but not limited to the user being shown a recommendation for lunch as they approach a fast food restaurant at midday, being shown a recommendation for lunch because the app has tracked them on the bus for 1.5 hours, being shown a recommendation for the local bookstore as the bus approaches it because that user's profile contains the data that they like reading, or being shown an advertisement for the local CVS so the user can purchase a gift for Valentine's Day.

In another hypothetical usage of the inventive system and method, a user has entered an office building. This would be deemed to be a "high touch surface" location for several reasons, to include but not limited to the high number of light switches (all the germs around the plastic switch, touched by millions of dirty fingers over the years, add up to about 217 bacteria per square inch) and computer keyboards (approximately 10% of computer keyboards were considered a health hazard, according to a British study; one was even discovered to have more bacteria than your average toilet.)

In yet another hypothetical usage of the inventive system and method, a user is in a retail setting, exposed to countless shopping carts. A study from the University of Arizona found that shopping carts were loaded with more bacteria, saliva, and fecal matter than escalators, public telephones, and even public bathrooms.

If the user were to be located at a hotel, the "high touch surface" threshold would be triggered for a variety of reasons, to include but not limited to the remote controls in each room (remote controls are home to pathogens like MRSA, VRE, and SARS, which can be transferred simply by changing the channel) and doorknobs in every common area. A University of Arizona research team placed a harmless virus with similar properties to norovirus on surfaces like doorknobs and tabletops and found that up to 60% of people in that building had the virus on their hands within a few short hours.

If a user is taking a break at work to use the rest room, the user might engage with their mobile device to pass the time while doing so. In this scenario, the user is engaged with Netflix or playing a mobile game that tracks how long he/she is engaged. Utilizing time sensitive algorithms, this uptick in duration/level of user engagement and screen activity, along with the time of day, is then analyzed by the AI to identify that the user is most likely using the rest room, which triggers the "high touch surface" threshold—as it is known that public restrooms are another opportune location for the festering and propagation of bacteria and viruses.

In a study published in the November 2014 issue of *Applied and Environmental Microbiology*, researchers selected four bathrooms at San Diego State University (a high-traffic and a low-traffic bathroom for each gender). The bathrooms were thoroughly cleaned at the study's start with bleach solution, which killed any existing germ communities. Then, during the following hours, days, weeks and months of human use, the researchers periodically swabbed soap dispensers, floors and toilet seats in all four restrooms for microbe samples. Because some microscopic organisms won't grow in petri dishes (especially those evolved for life in the human gut), the researchers used genetic sequencing technology to get a more comprehensive evaluation. Within one hour of sterilization, the bathrooms were completely recolonized with microbes. Fecal bacteria dominated, including on toilet seats and on soap dispensers—about 45% of the bacteria there were of fecal origin. In all, the scientists found genetic traces of more than 77,000 distinct types of bacteria and viruses. When the team tried growing cultures from different surfaces in each room, they found one set of live bacteria in overwhelming abundance: *Staphylococcus* (a genus of spherical bacteria, occurring in pairs, tetrads, and irregular clusters, certain species of which, as *S. aureus*, can be pathogenic for humans). As such, bacterial contamination while in a public restroom is extremely high.

After leaving a subway station (which is full of "high touch surfaces") the user might be prompted to apply a cleaning agent to their device, hands, and/or face. In addition to this cleaning recommendation, since the user is located near a fast food restaurant by the geo-positioning technology of the mobile app, they may be provided with promotional messaging about that restaurant. Then, upon leaving the restaurant, that user would receive a message informing them about the high level of bacteria on fast food restaurant counters and table tops, with the recommendation to reapply the cleaning agent to their device, hands, and/or face (This process of recommending products to the user in a continual loop is deemed "cyclical recommendations").

Also, in the event of any publicized local bacterial contamination event, the inventive system will pull the relative information from the respective news outlets and notify users of said contamination events within their geographical region, through the associated mobile app, push SMS, email, or other messaging technique.

As mentioned previously, one of the biggest contributors to bacteria contamination susceptibility is interacting with "high touch surfaces" throughout the day and then spreading that contamination onto all of the things you touch. According to a study by researcher Dscout, the top 10% of smartphone users click, tap or swipe on their phone 5,427 times a day. The other 90% touch their device 2,617 times a day on average.

As such, one way with which to ascertain the amount of times a user touches their mobile device with their fingers is through tracking movement in touch events (for example but not limited to whenever there is a change in the current touch contact position, pressure, or size; all of these touch events are recorded). The inventive system and method will be able to track both movement-based gestures (such as a swipe) and non-movement gestures (such as a single tap). The frequency of these gestures is also recorded and used to make recommendations to the user.

Likewise, by engaging the accelerometer of the user's mobile device, the inventive system can track how frequently the user moves the device within a set proximity of their face (and therefore increases the likelihood of transferring the harmful bacteria and pathogens to their face).

Proven scientific findings and laboratory data will be used to provide the mobile app programmers of the inventive system with a series of "high touch surface" bacteria thresholds that, when triggered, will cause a different product or service to be recommended to the user by the mobile app. For example, being inside a hospital is not as bad as being in a school, which is still better than being on public transportation—based on the sanitization requirements at each location. Therefore, the recommended cleaning, sanitizing, disinfecting, and other products and services for use while/after riding public transportation are greater (in quantity, frequency of application, etc.) than those recommended for use while at a more sterile hospital environment.

The AI and algorithms will perform a correlation between the locations the user has been, what activities they have engaged in, and the number of times they have touched their mobile device and make recommendations regarding the cleaning products and protocols to be used on their mobile device, person, vehicle, or other purpose.

Once the user has received the alert from the system notifying them of the need to clean their mobile device, person, vehicle, or other purpose, as well as the reason for doing so and the recommended products to use, the user can apply said products to their mobile device, person, vehicle, or other purpose, as recommended.

In the event the user does not have the recommended products, the inventive system will offer the user the opportunity to acquire the recommended cleaning, sanitizing, disinfecting, and other products and services through the mobile app, either directly from the marketer/brand or indirectly from a third party retailer (for example but not limited to eCommerce or the nearest affiliated brick-and-mortar retail location).

Once the user has applied the recommended products to their mobile device, person, vehicle, or other purpose, as recommended, they will be prompted by the system to acknowledge the cleaning has occurred. This can be accomplished by manually switching a digital toggle or pressing a virtual button in an onscreen Graphic User Interface (GUI) to notify the system that the mobile device, person, vehicle, or other item has been cleaned.

As the user continues to engage with the mobile app, the system will learn for example but not limited to the user's habits, tendencies, and product burn rate (e.g. for the recommended cleaning, sanitizing, disinfecting, and other products and services), so that it can then utilize predictive analytics to make recommendations for cleaning, sanitizing, disinfecting, and other such products and services in the future, and proactively order these items on behalf of the user on an ongoing basis (i.e. continuity/subscription purchase program).

A formula that tracks the Activity+Location+Time (between cleanings) of the user's device will result in a score that represents the estimated cleanliness of the phone and once a certain score is reached (i.e. a score threshold) the system will then provide the user with a specific cleaning and/or product recommendation.

In the above formula, the number of locations visited may represent a multiplier. So if the user has been to one location, the score is multiplied by 1.1, after 2 locations the multiplier 1.2×. After 10 locations, it's a 2.0× multiplier and so on.

For example, if a user drains their phone battery from 100% down to 0% throughout the day, the system gives them a base score of 100. This is then multiplied by the number of high-risk locations that user has taken their device. So, if the user has been to 5 high touch locations, the base score of 100 is multiplied by a 1.5 factor, equaling 150. This score is then multiplied by time elapsed, which will end in a score of between 150 and 300 in a day, for example. If the user reaches the set threshold, they will receive the appropriate recommendations for cleaning and the best products to use.

In one embodiment, the formula will utilize all three factors: Activity, Location, and Time (between cleanings).

In another embodiment, the formula may not utilize all three factors: Activity, Location, and Time (between cleanings). For example, if the user has cleaned their phone and put it down for several hours, time will elapse between cleanings, but since their usage rate won't register (as they are not using it), the score will increase minimally. In another example, if a user is not actively engaging with their device, but they are travelling to several high touch locations in a short period of time, their score will increase to reflect these high-risk areas and the prompt will be delivered from the system to the user's device that will both educate the user about these areas and the potential for contamination, but also advising them to clean their items (and which products are best suited for doing so).

Figure 2:
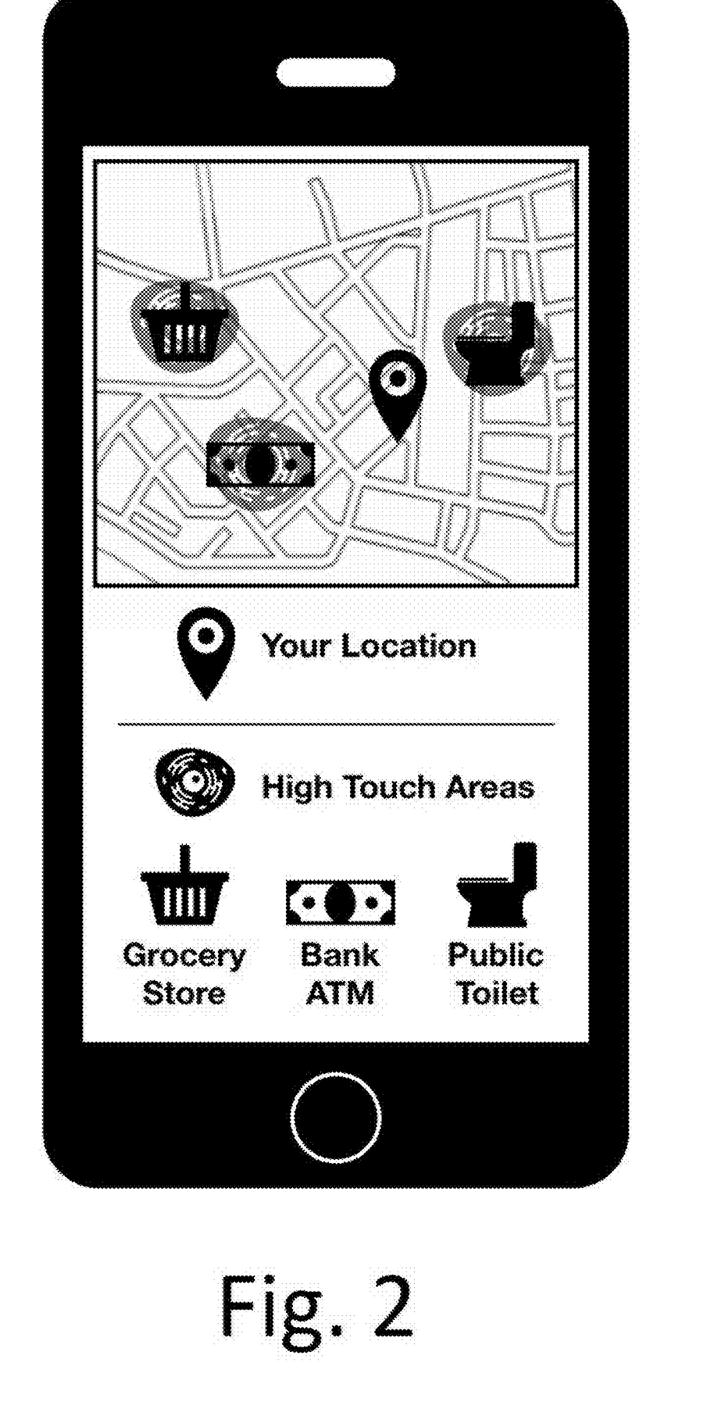
FIG. 2 provides an example of the application displaying nearby high touch areas.

FIG. 2 provides an example of the Graphic User Interface (GUI) of an application on a mobile device, displaying the user's location, as well as nearby high touch areas.

Figure 3:
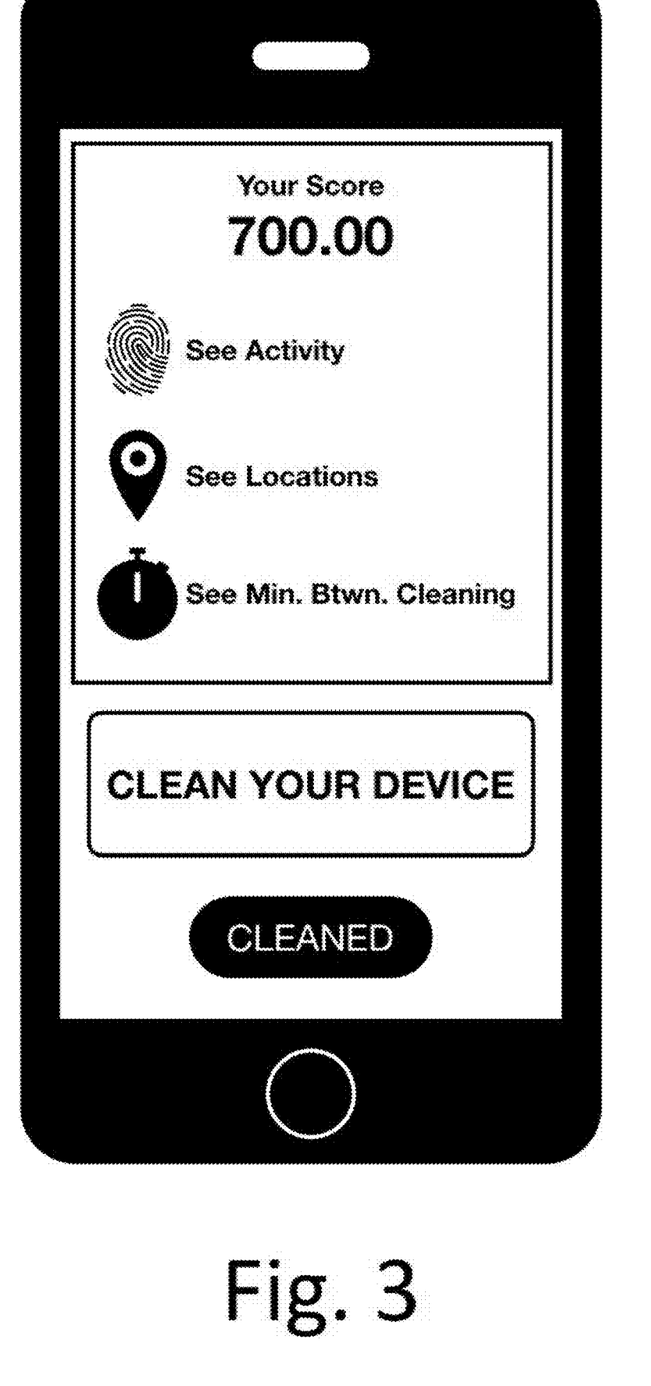
FIG. 3 provides an example of the application displaying the user's score.

FIG. 3 provides an example of the Graphic User Interface (GUI) of an application on a mobile device, displaying the user's score, as calculated by assessing their device usage (via battery consumption in this example), along with number of locations visited and time between cleaning (in minutes). This illustration also includes the automated prompt from the system to the user to clean their device, as well as a digital button to press once they have cleaned their device (which resets the score to zero).

Figure 4A:
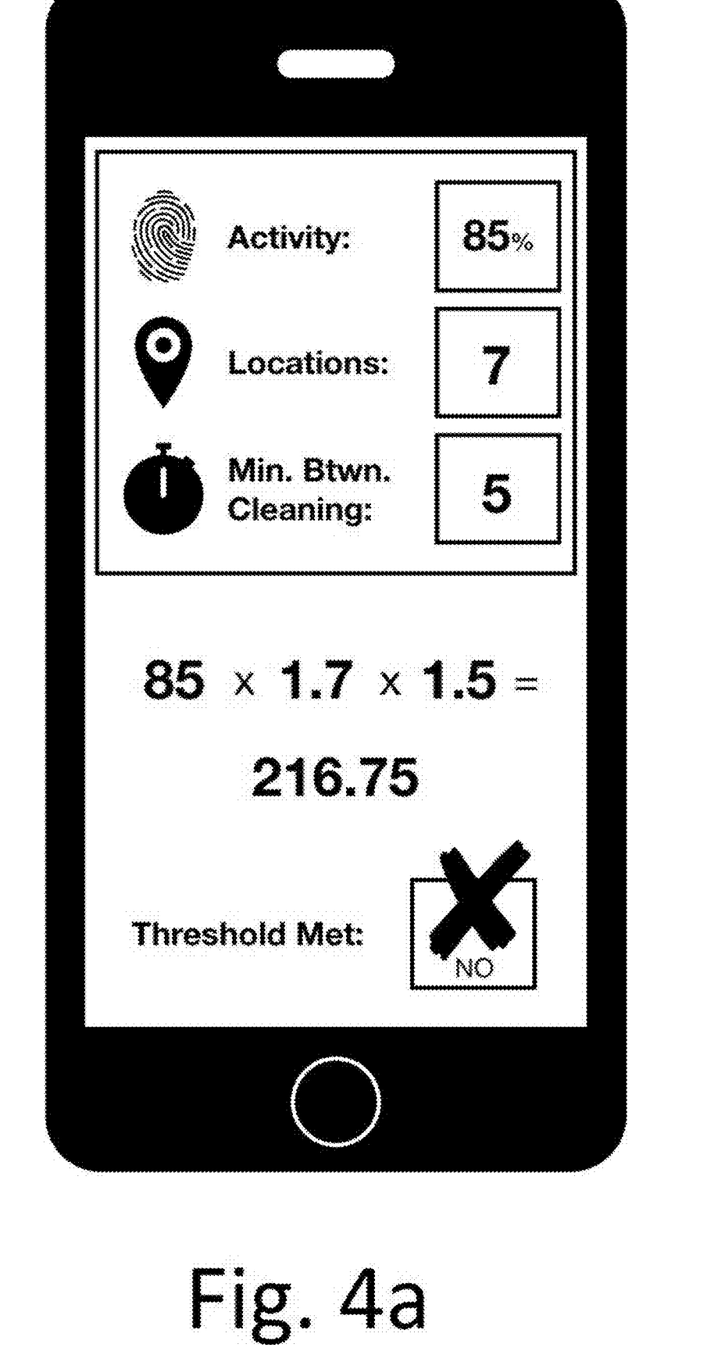
FIG. 4a and FIG. 4b display the backend calculation of the formula with which the system determines the user's score.
Figure 4B:
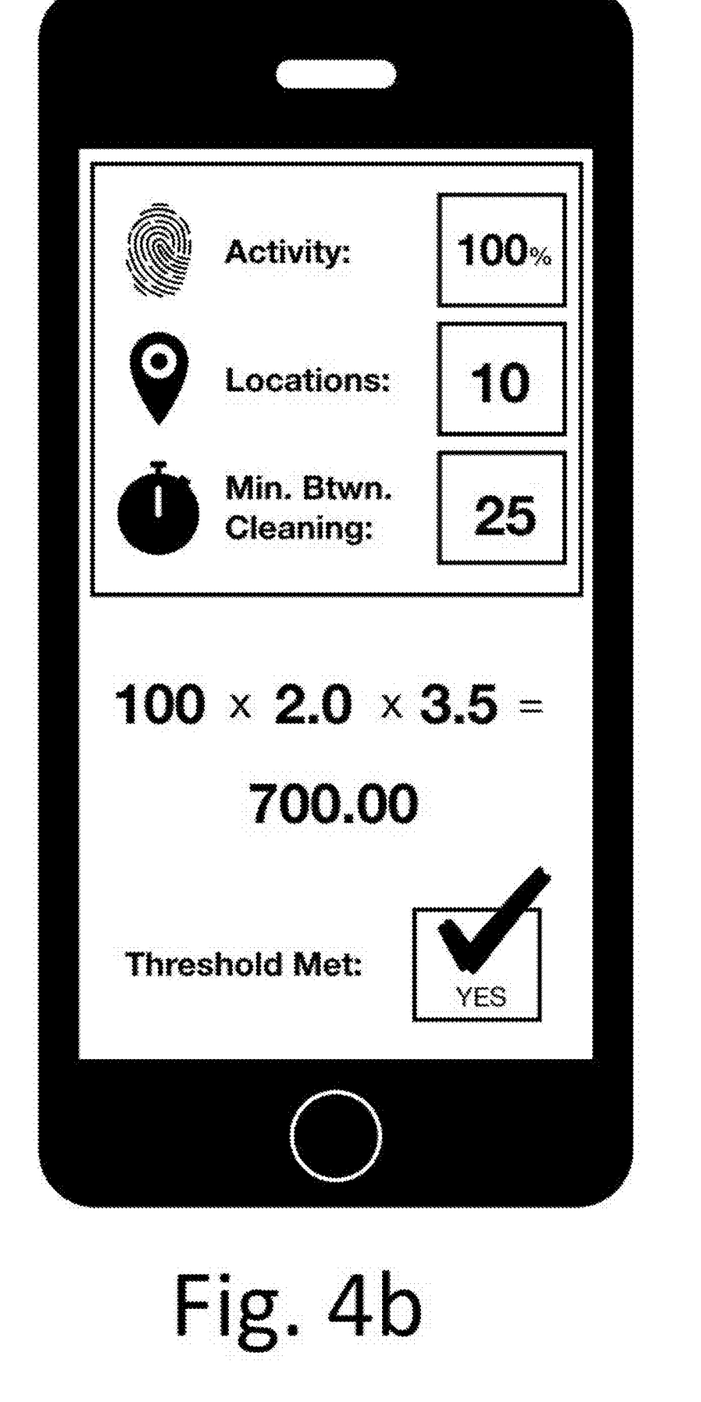

FIG. 4a and FIG. 4b provide examples of the Graphic User Interface (GUI) of the application on a mobile device, displaying the backend calculation of the formula with which the system determines the user's score. In these examples, the factors utilized include the device usage (via battery consumption in this example), along with number of locations visited and time between cleaning (in minutes). In FIG. 4a, the threshold has not yet been met, as the score is not high enough. In FIG. 4b, once the score is high enough, the threshold is met, which triggers the automated prompt from the system to the user to clean their device.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A method comprising;
tracking, via an activity tracking unit of a mobile computing device, a location, a movement, and a velocity of the mobile computing device, the mobile computing device being associated with a user;
based on the tracking, determining that the user is in a high touch surface location, wherein the high touch surface location includes a location susceptible to germs and bacteria;
tracking, via an input/output unit of the mobile computing device, gestures of the user, the gestures including at least swipes and taps performed by the user with respect to a screen of the mobile computing device;
based on the tracking, determining a number of the gestures and a frequency of the gestures to determine a level of engagement of the user with the mobile computing device;
based on the determining that the user is in the high touch surface location and the level of engagement of the user with the mobile computing device, calculating a score associated with an estimated cleanliness of the mobile computing device;
determining that the score exceeds a predetermined threshold, the predetermined threshold being set for the high touch surface location; and
based on the determining that the score exceeds the predetermined threshold, presenting, via a graphic user interface of the mobile computing device, to the user, a notification concerning steps to take to protect the user.

2. The method according to claim 1, further comprising:
recommending to said user a variety of cleaning, sanitizing, and disinfecting products and services.

3. The method according to claim 2, wherein said products and services are for one or more from a set of mobile device, person, vehicle, apparel, portable furniture, electronic devices, keys, jewelry, tools, equipment, gear, or accessories.

4. The method according to claim 2, further comprising:
utilizing artificial intelligence for recommending.

5. The method according to claim 2, wherein the recommending is based on one or more from a set of the location of the user, an activity of the user, time of day, current weather, forecasted weather, notes, reminders, calendar events, and information stored in a user profile associated with the user.

6. The method according to claim 2, wherein the mobile computing device further includes an educational component.

7. The method according to claim 6, wherein the educational component is configured to alert the user about a need of cleaning and educate the user about features, functionality, and attributes of a specific product or service for said cleaning.

8. The method according to claim 2, further comprising:
performing a correlation between locations the user has been, activities the user has engaged in, and a number of times the user has touched the mobile computing device, wherein the number of times is the number of the gestures.

9. The method according to claim 2, further comprising:
learning from habits and actions of the user.

10. The method according to claim 2, wherein the tracking of the gestures includes; tracking movement-based gestures and non-movement gestures.

11. The method according to claim 2, wherein the tracking of the location of the mobile computing device is performed through one or more from a set of GPS, Bluetooth, and internal hardware and software.

12. The system method according to claim 2, further comprising:
monitoring usage of the mobile computing device by the user via an accelerometer or internal hardware and software of the mobile computing device.

13. The method according to claim 2, further comprising:
monitoring usage of applications on the mobile computing device by the user and corresponding battery consumption.

14. The method according to claim 2, further comprising:
alerting the user to clean.

15. The system method according to claim 14, further comprising:
prompting the user to use recommended products and prompting the user to acknowledge the cleaning.

16. The method according to claim 14, further comprising:
offering the recommended products for purchase.

17. The method according to claim 1, further comprising:
recommending to said user a variety of products and services not for cleaning, sanitizing, and disinfecting.

18. The method according to claim 17, wherein the variety of products and services are for one or more from a set of eateries, retailers, entertainment venues, sporting events, musical acts, stage productions, and other local services or products.

19. The method according to claim 17, wherein the recommending is based on one or more from a set of the location of the user, an activity of the user, time of day, current weather, forecasted weather, notes, reminders, calendar events, and information stored in a user profile associated with the user.

20. The method according to claim 1, wherein the high touch surface location is associated with a high touch surface, wherein the high touch surface includes a surface that receives a high volume of human contact.

* * * * *